(12) United States Patent
Leonard et al.

(10) Patent No.: US 8,333,545 B2
(45) Date of Patent: Dec. 18, 2012

(54) ROOF WIND-POWER GENERATOR DEVICE

(75) Inventors: Philippe Leonard, Hohfrankenheim (FR); Pol Van De Perre, Aartselaar (BE)

(73) Assignee: Aeolta SAS, Strasbourg (FR)

( * ) Notice: Subject to any disclaimer, the term of this patent is extended or adjusted under 35 U.S.C. 154(b) by 506 days.

(21) Appl. No.: 12/577,694

(22) Filed: Oct. 12, 2009

(65) Prior Publication Data

US 2010/0329858 A1 Dec. 30, 2010

(30) Foreign Application Priority Data

Jun. 24, 2009 (FR) ...................... 09 03108

(51) Int. Cl.
*F03B 15/06* (2006.01)
*F03D 7/00* (2006.01)
*F01D 25/26* (2006.01)
*F01D 25/28* (2006.01)

(52) U.S. Cl. ...................... 415/2.1; 415/213.1

(58) Field of Classification Search .................. 415/4.2, 415/4.4, 93, 907, 213.1, 2.1; 416/DIG. 6; 52/40, 65, 72, 749.12, 749.11
See application file for complete search history.

(56) References Cited

U.S. PATENT DOCUMENTS

| | | | |
|---|---|---|---|
| 2,373,207 A * | 4/1945 | Touhey | 290/44 |
| 2006/0059858 A1* | 3/2006 | Layman | 52/749.12 |
| 2010/0037541 A1* | 2/2010 | Kane | 52/173.1 |
| 2010/0068030 A1* | 3/2010 | Nightingale et al. | 415/60 |
| 2010/0126086 A1* | 5/2010 | Paggi | 52/173.1 |

* cited by examiner

*Primary Examiner* — Christopher Verdier
*Assistant Examiner* — Su Htay
(74) *Attorney, Agent, or Firm* — Egbert Law Offices, PLLC

(57) ABSTRACT

A windpower generator apparatus having a rotor with an axis of rotation placed in a frame adapted to a ridge of a roof. The frame has a pair of deflectors suitable for focusing air flow toward the rotor. Each of the deflectors has a pair of side walls, an upper wall and a lower wall defining a tunnel narrowing toward the rotor. The pair of deflectors having parts respectively at the upper walls and the lower walls so as to conform to a slope of the roof and to maintain a same ratio between openings at opposite ends of the deflectors.

5 Claims, 3 Drawing Sheets

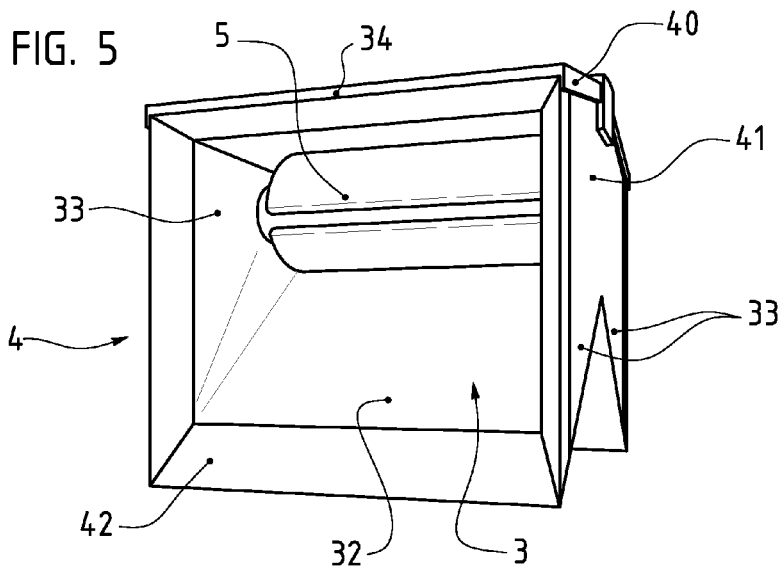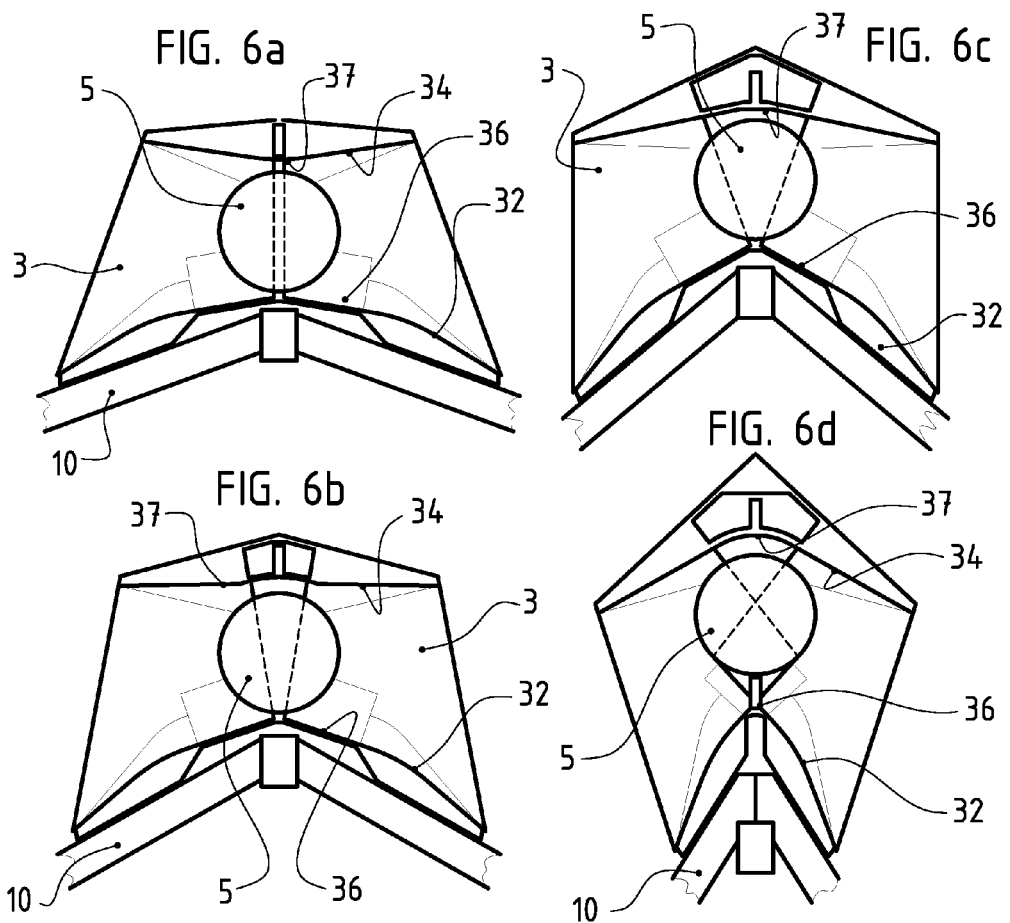

ROOF WIND-POWER GENERATOR DEVICE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a modular roof wind-power generator device.

A roof wind-power generator device consists of a wind-power generator arranged on the roof of a building permitting to use the height of said building to collect the air flows.

Advantageously, such a device is preferably arranged at the ridge of the roof, so as to use the slope of the latter as a deflector and, hence, as an accelerator.

2. Description of Related Art Including Information Disclosed Under 37 CFR 1.97 and 37 CFR 1.98

The rotors used are of all types, namely with a vertical or horizontal axis of rotation, with an axis of rotation substantially in the direction of the wind or substantially at right angles with respect to the direction of the wind. Most frequently used are the rotors with a horizontal axis parallel to the ridge of the roof.

The most often used ones among the roof wind-power generator devices each include a rotor placed in a frame aimed at being arranged on the ridge of a roof, said frame comprising, on each of both sides of the roof, on both sides of the ridge edge, a set of deflectors capable of focusing the air flows in the direction of said rotor.

Many roof wind-power generator devices are known, such as e.g. those described in DE 9314187 and DE 19644890.

The implementation of a roof wind-power generator device requires many arrangements of the building, whether said device is installed during the construction of said building or afterwards. On the other hand, the wind-power generator device must necessarily undergo structural modifications in order to permit its adapting to the shape of the roof, and more specifically to the slope of the latter.

Now, these various modifications can have an impact on the operation of the wind-power generator device, and not only on its performances. That is why the roof wind-power generator devices are generally each designed for a roof with a particular angle of inclination.

BRIEF SUMMARY OF THE INVENTION

Therefore, the aim of the present invention is to provide a roof wind-power generator device that has many advantages, on the one hand, from the viewpoint of the efficiency and, on the other hand, from the viewpoint of the operation, and that is in addition modular, so that it can be adapted to the architecture of the roof, namely its slopes, while keeping its efficiency and operation performances.

The roof wind-power generator device according to the invention includes a rotor with a horizontal axis of rotation substantially at right angles with respect to the direction of the wind, and placed in a frame aimed at being arranged on the ridge of the roof. The frame comprises, on each of both sides of the roof, on both sides of the ridge edge, a set of deflectors capable of focusing the air flows in the direction of said rotor, and wherein each of said sets of deflectors comprises four walls, two side walls, an upper wall and a lower wall. The walls form a cone-shaped tunnel narrowing from its outer end to its end on the side of said rotor, and they are shaped, internally to said tunnel, so that the junction area between two adjacent walls has a square profile on the side of said outer end, and a rounded profile on the side of said rotor, the passing from one profile to the next one occurring progressively. The frame and said sets of deflectors include means designed capable of permitting an adapting to the slopes of the roof, while keeping for said tunnels the same ratio between their opening on the outer side and their opening on the side of said rotor.

According to an additional feature of the device according to the invention, the frame includes a reinforcement comprising first elements designed capable of being fixed to the framework of the roof to be equipped and of receiving the sets of deflectors, and second elements designed capable of receiving the rotor, said first and second elements being made integral with each other through evolving connecting means adaptable to the slopes of said roof.

According to another additional feature of the device according to the invention, the first elements consist of two pairs of arms each comprising two sections including an angle between them, one of the arms of a pair being aimed at being made integral by a section with the framework, parallel to the slope of the latter, while the other arm of the same pair is aimed at being made integral by a section with the framework, parallel to the other slope, both free sections being upright and connected through connecting means.

According to another additional feature of the device according to the invention, the connecting means comprise a planar element arranged in a vertical plane perpendicular to the ridge edge, and in which is provided for a slot having the shape of an arc of a circle through which is made the connection with the free section of an arm with the possibility of displacement of the connecting organ in said slot.

According to another additional feature of the device according to the invention, the junction of the lower wall of a set of deflectors with the lower wall of the other set of deflectors occurs through a part made of flexible or semi-rigid material designed capable of being deformed and/or cut so as to be adapted to the slopes of the roof.

According to another additional feature of the device according to the invention, the part made of flexible or semi-rigid material is formed of two parts connected and assembled by means of a seal.

According to another additional feature of the device according to the invention, the junction of the upper wall of a set of deflectors with the upper wall of the other set of deflectors occurs through a part made of flexible or semi-rigid material designed capable of being deformed and/or cut so as to be adapted to the slopes of the roof.

The advantages and the features of the device according to the invention will become clear from the following description, which relates to the attached drawing that represents one non-restrictive embodiment of same.

BRIEF DESCRIPTION OF THE SEVERAL VIEWS OF THE DRAWINGS

FIGS. 4a and 4b show perspective views of elements the same device is comprised of.

FIG. 5 shows a schematic perspective view of a roof wind-power generator device according to the invention.

FIGS. 6a, 6b, 6c and 6d show schematic elevation views seen in profile of the same device in different configurations of use, depending on the slopes of the roof.

DETAILED DESCRIPTION OF THE INVENTION

Figure 1:
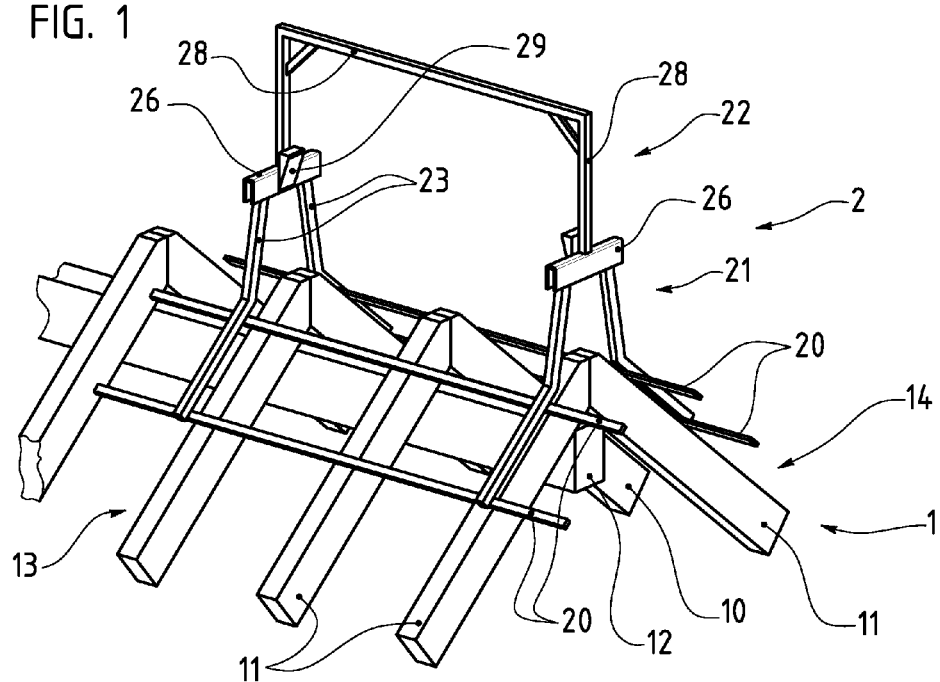
FIG. 1 shows a schematic partial perspective view of part of a roof wind-power generator device according to the invention, installed on a framework.

When referring to FIG. 1, one can see a roof 1 and in particular part of its framework 10, namely rafters 11 and a ridge purlin 12, aimed at receiving a roof wind-power generator device according to the invention. It should be noted that reference will be made, in the following description, to the installation of a roof wind-power generator device on a roof, knowing that it is perfectly possible to install several of them on one and the same roof, in a juxtaposed way or not.

The roof 1 is of a classical type; i.e. it includes two slopes 13 and 14, each including the same angle. The roof wind-power generator device according to the invention is adaptable to the roof 1, irrespective of the angle of inclination of the slopes 13 and 14. It should be noted that it is also possible to adapt the roof wind-power generator device according to the invention to a roof both slopes of which have different angles of inclination.

In FIG. 1, the frame 2 of the roof wind-power generator device according to the invention can be seen, which comprises:

cross beams 20 made integral with the rafters 11, transversally to the latter; first supporting elements 21 fixed to the cross beams 20; and second supporting elements 22 made integral with the first elements 21 and aimed at bearing the rotor, not shown.

Figure 2:
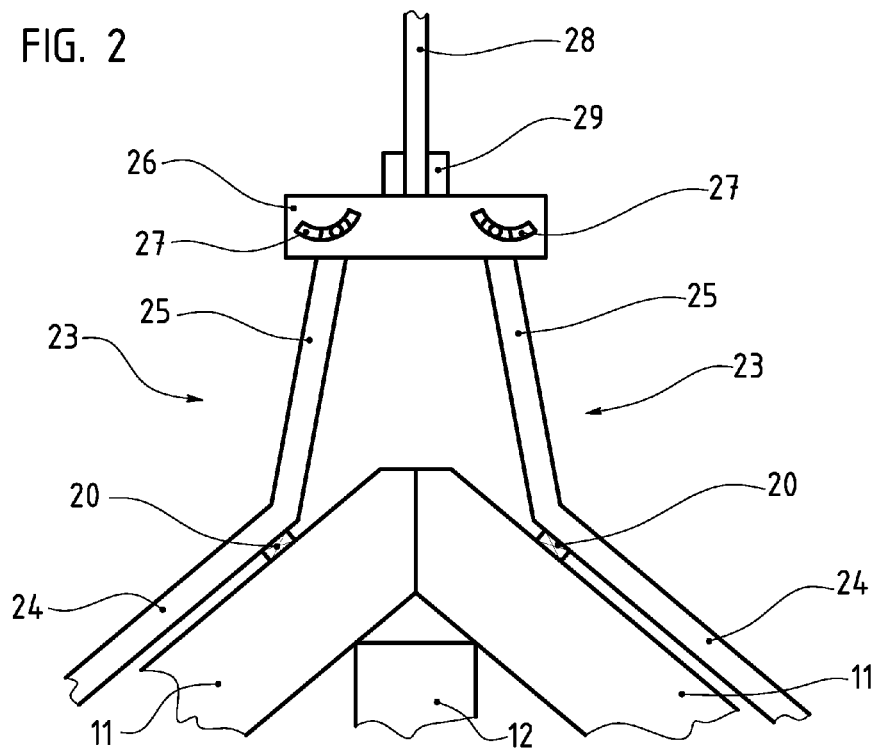
FIG. 2 shows a schematic partial elevation view seen in profile of the same part of the same device on the same framework.

When referring also to FIG. 2, one can also see that the first elements 21 consist of two pairs of arms 23, each one comprising two sections 24 and 25 including between them an angle, in this case of 140°, non-restrictively.

For each of the pairs of arms 23, the sections 24 of the two arms 23 are made integral with the cross beams 20, one on the side of the slope 13 and the other one on the side of the slope 14, while the sections 25 stand upwards in order to be connected to the second elements 22 through a connecting plate 26.

The fixing of each section 25 to the connecting plate 26 occurs at the level of the latter through a slot 27 having the shape of an arc of a circle in which a connecting organ such as a screw or the like can move, and which permits an angular displacement of the section 25 and, hence, of the arm 23 with respect to the plate 26, so as to permit an adapting to the slope 13 or 14.

The second elements 22 consist of two brackets, each integral with a connecting plate 26, and connected through a beam 28 parallel to the ridge purlin 12. It should be noted that each of the plates 26 includes, on the inner side, a bracket 29 aimed at making integral the rotor.

Figure 3:
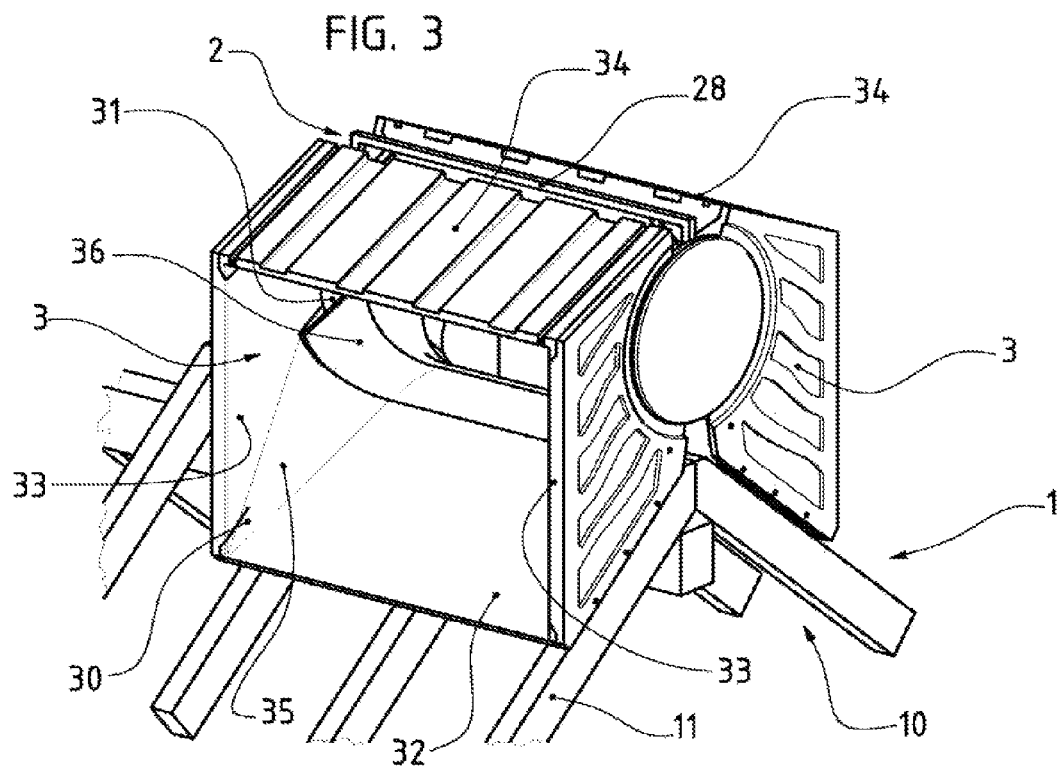
FIG. 3 shows a schematic partial view of the device according to the invention on the same framework.

After firm connection of all the elements of the frame 2 to each other as well as to the framework 10 through cross beams 20, the frame 2 is provided with deflector means, as can be seen in FIG. 3, which form two tunnels 3 arranged on both sides of the second means 22. Only the beam 29 is visible, each tunnel 3 comprising, at the outer side, an opening 30 and, at the inner side, an opening 31 emerging on the rotor, not shown. The tunnels have a general conical shape, i.e. they are narrowing from the opening 30 towards the opening 31.

Each tunnel 3 comprises a lower wall 32 fixed to the cross beams 23, two side walls 33 enclosing the lower wall 32 and each fixed to an arm 23, and an upper wall 34 enclosed between the two side walls 33 and fixed to the latter.

The junction between two adjacent walls occurs through an area 35 in the conical portion; i.e. this junction has a square profile at the side of the opening 30, and a rounded profile with a large radius on the side of the opening 31, the passing from one profile to the other one occurring progressively. Thus, the opening 30 consists of a rectangle, while the opening 31 has an oval or elongated shape.

Figure 4A:
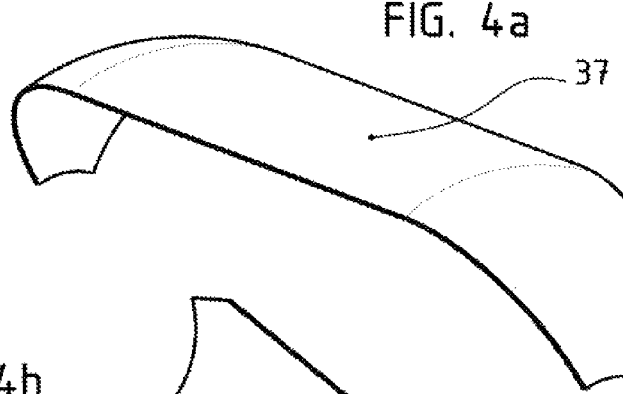
Figure 4B:
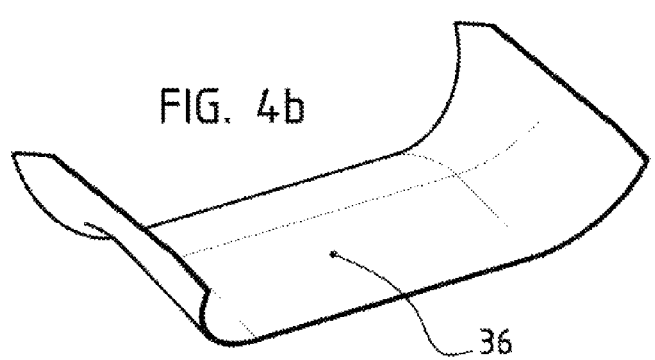

The junction between the two lower walls 32 of the two tunnels 3 occurs through a part 36 made of flexible or semi-rigid material, only shown in FIG. 4b, while the junction between the upper walls 34 occurs by means of a part 37 made of flexible or semi-rigid material, only shown in FIG. 3.

The parts 36 and 37 are aimed at covering more or less the walls 32 and 34, respectively, depending on the inclination of the slopes 13 and 14. It should be noted that these parts 36 and 37 can be designed cuttable to length.

Furthermore, the part 37 can be designed made of two portions that can be assembled by means of a junction seal.

After assembling of the deflector means, the roof wind-power generator device 4 according to the invention, shown in FIG. 5, can be clad, so as to be in harmony with the esthetics of the building equipped with same. The tunnels 3, only one of which is visible, are thus covered with a roof 40, while the side walls 33 are provided with side plates 41.

It should be noted that the openings 30 of the tunnels 3 are provided with a frame 42 the elements of which are beveled.

The rotor 5, which is arranged at the junction of both tunnels 3, has a horizontal axis substantially at right angles with respect to the direction of the wind. It can have various architectures, non-restrictively e.g. of the Savonius type.

When referring now to FIGS. 6a, 6b, 6c and 6d, one can see four different configurations of installation of the roof wind-power generator device according to the invention, each one being different because of the angles of inclination of the roof 1, 20°, 30°, 40° and 60°, respectively, with respect to the horizontal line.

The tunnels 3 are not deformed, but, since their lower walls 32 are parallel to the slopes 13 and 14, there is created, depending on the angle of inclination, an angular distance between both tunnels 3. The gaps created by this angular distance are filled by means of the parts 36 and 37, which permit to ensure a continuity of the lower 32 and upper 34 walls. The parts 36 and 37 have a cross-section with a particular shape, thus the part 37 has a concave shape, substantially concentric to the rotor 5, while the part 36 is convex.

Thus, the tunnels 3 keep their technical features, irrespective of the inclination of the roof.

At the level of the manufacture, the frame 2 is made out of metal, while the deflector means are made out of plastic.

The various walls 32, 33 and 34 are advantageously obtained through molding, by integrating encasing means, so as to permit an easy implementation.

We claim:

1. A windpower generator apparatus for use on a roof, the roof having a ridge with sides sloping downwardly therefrom, the windpower generator apparatus comprising:

a rotor having a horizontal axis of rotation; and a frame suitable for placement on the ridge of the roof, said frame having a set of deflectors suitable for positioning on the sloping of the sides of the roof, said set of deflectors adapted to focus a flow of air toward said rotor, each of the deflectors having a pair of sidewalls and an upper wall and a lower wall, all four of the walls of each deflector defining a tunnel narrowing from an outer end thereof toward an end adjacent said rotor, all four of the walls of each deflector defining a square profile at said outer end and a rounded profile at said end adjacent said rotor, all four of the walls of each deflector being shaped progressively between said square profile to said rounded profile, said frame and said set of deflectors affixed to a structure adapted to the sloping of the sides of the roof so as to maintain a same ratio between an opening defined by all four of the walls of each deflector of said outer end and an opening defined by all four of the walls of each deflector adjacent said rotor, said structure having two pairs of arms, wherein each arm having a section with an inclination conforming to the sloping of the sides of the roof and another section extending upwardly therefrom, said structure having two connecting plates, wherein each connecting plate is affixed to the another sections of each of the pairs of arms, each of the another sections of said pairs of arms affixed within a slot formed in said connecting plate, said structure having a first part and a second part, said first part extending over ends of the lower walls adjacent said rotor, said second part extending over ends of the upper walls adjacent said rotor.

2. The windpower generator apparatus of claim 1, said another section of each of said pair of arms receiving said rotor.

3. The windpower generator apparatus of claim 1, said section and said another section of each of said pair of arms being integrally connected and extending at an obtuse angle.

4. The windpower generator apparatus of claim 1, said connecting plate being a planar member adapted to extend in parallel relation to the ridge of the roof, the slot of the connecting plate having a shape of an arc.

5. The windpower generator apparatus of claim 1, said first part having a shape conforming to the slope of the roof.

* * * * *